United States Patent [19]

Crocker

[11] Patent Number: 4,769,077
[45] Date of Patent: Sep. 6, 1988

[54] CEMENTITIOUS GROUT PATCHING FORMULATIONS AND PROCESSES

[75] Inventor: David A. Crocker, Grand Prairie, Tex.

[73] Assignee: Texas Industries, Inc., Dallas, Tex.

[21] Appl. No.: 68,889

[22] Filed: Jun. 30, 1987

[51] Int. Cl.4 .................... C04B 24/00; C04B 24/04; C04B 7/32

[52] U.S. Cl. .................... 106/90; 106/104; 106/315; 106/89

[58] Field of Search .................... 106/89, 90, 315, 104

[56] References Cited

U.S. PATENT DOCUMENTS

| | | | |
|---|---|---|---|
| 3,775,143 | 11/1973 | Mikhailov et al. | 106/104 |
| 3,801,338 | 4/1974 | Whitaker | 106/90 |
| 3,819,393 | 6/1974 | Ono et al. | 106/89 |
| 3,852,081 | 12/1974 | Lehman . | |
| 3,857,714 | 12/1974 | Mehta | 106/104 |
| 3,861,929 | 1/1975 | Deets et al. | 106/89 |
| 4,033,282 | 7/1977 | Ray et al. | 106/315 |
| 4,045,237 | 8/1977 | Gains et al. | 106/104 |
| 4,116,706 | 9/1978 | Previte | 106/90 |
| 4,191,584 | 3/1980 | Berry . | |
| 4,261,755 | 4/1981 | Berry et al. | 106/315 |
| 4,350,533 | 9/1982 | Galer et al. | 106/89 |
| 4,357,166 | 11/1982 | Babcock | 106/89 |
| 4,507,154 | 3/1985 | Burge et al. . | |

OTHER PUBLICATIONS

Title No. 73-26, Proposed ACI Standard: Recommended Practice for the Use of Shrinkage-Compensating Concrete, American Cement Institute Committee 223, ACI Journal, Jun. 1976, pp. 319-339 (pp. 8, 10 and 13).

TXI Publication, A Guide for Testing, Handling and Placing Type K Cement Concrete, a Shrinkage Compensating Cement, pp. 1-14 (pp. 8, 10 and 13).

*Primary Examiner*—William R. Dixon, Jr.
*Assistant Examiner*—David M. Brunsman
*Attorney, Agent, or Firm*—Richards, Harris, Medlock & Andrews

[57] ABSTRACT

A dry cementitious composition which is shrinkage compensating and fast-setting for use in grouting repair of concrete surfaces. The cementitious composition comprises a hydraulic cement mixture of a major amount of a first portland cement constituent and a minor amount of a second expansive ettringite sulfoalumina cement constituent, an aggregate component, and an accelerator component. The accelerator component is a polyvalent metal salt of formic acid, specifically an alkaline earth metal formate such as calcium formate. Specific formulations include a mixture of Type I, Type IP, or Type III cement as a first constituent with Type K, Type M, or Type S cement as a second constituent, with the ratio of the first to the second constituent within the range of 2-3. The material may be employed to affect a grouting repair by mixing the dry formulation with water to provide a cementitious slurry which sets to provide a compressive strength of at least 4000 psi at 24 hours and a positive volume change of no more than 0.1% at 14 days curing.

18 Claims, No Drawings

4,769,077

CEMENTITIOUS GROUT PATCHING FORMULATIONS AND PROCESSES

TECHNICAL FIELD

This invention relates to cementitious compositions and more particularly to shrinkage compensating fast setting cementitious compositions and processes of using such compositions in the grouting repair of concrete surfaces.

BACKGROUND ART

In the use of hydraulic cements it is a conventional practice to employ accelerators which shorten the time required for the cement (or concrete) to achieve set. Suitable accelerators for use in cementitious compositions include polyvalent. metal salts of formic acid such as the alkaline earth metal or transition metal formates. Such formate salts may be used alone or in combination with other agents. For example U.S. Pat. No. 4,507,154 to Burge et al discloses a cement accelerator composed of a formic acid salt such as calcium, magnesium, iron or aluminum formate in combination with alumin hydroxide and a swellable polymer such as hydroxyethyl cellulose.

U.S. Pat. Nos. 4,191,584 (Berry) and 4,261,755 (Berry et al) disclose the use of formate accelerators in applications where rapid setting is desirable such as in cold climatic conditions or in the production of prefabricated concrete shapes. Both patents are directed to overcoming what is termed a major disadvantage, the relatively low water solubility of neutral calcium formate. Berry '584 discloses the use of calcium polyformate in an amount within the range of 0.2-5% by weight, either alone or in admixture with calcium formate. Berry et al '755 contains a similar disclosure with respect to the use of an acid formate as an accelerator.

Another application of accelerators in achieving fast setting times and high early strengths is in the formulation of cementitious compositions useful as patching or topping compositions where only limited time is available to complete the work. For example, U.S. Pat. No. 4,033,782 to Ray et al disclose a calcium aluminate cement based grouting composition in which calcium formate is used as an accelerator. The patching compositions disclosed in Ray et al contain, on a dry basis, up to about 75% aggregate (a mixture of a gravel and sand) about 20-25% high alumina cement, about 2-3% each of calcium formate and gypsum, and minor amounts of silica flour and calcium lignosulfonate.

U.S. Pat. No. 3,801,338 to Whittaker discloses an accelerator additive for use in hydraulic cements which comprises a major amount of sodium nitrate in admixture with a minor amount of calcium formate. The additive composition is disclosed as added to ordinary portland cements and to sulfate resisting cements. The additive decreases the setting time of both types of cements.

U.S. Pat. No. 3,852,081 to Lehman discloses quick-setting, high-early strength cementitious compositions based upon a portland cement component of relatively low tricalcium aluminate content. In experimental work reported in Lehman, comparative test specimens were formed using cementitious mixtures based upon equal parts of alpha calcium 25 sulfate hemihydrate and either Type I portland cement (containing 9.47% tricalcium aluminate) or Type V portland cement, containing 3.82% tricalcium aluminate. The test specimens were immersed in water for a period of one year. As explained in Lehman, the formation of ettringite in the set cement by the reaction of tricalcium aluminate with sulfate caused the specimens based upon the Type I cement to expand and become deteriorated to the point of failure after water immersion for a period of 12 months. For the specimens based upon Type V portland cement, expansion due to ettringite formation was minimized. These specimens showed little or no evidence of failure for periods ranging up to 21 months.

DISCLOSURE OF THE INVENTION

In accordance with the present invention there is provided a new and improved shrinkage compensated fast setting cementitious composition which is particularly well suited in patching applications such as in the grouting repair of pavement surfaces such as concrete roadways and the like. The cementitious composition of the present invention comprises a hydraulic cement component having a major amount of a first cement constituent and a minor amount of a second cement constituent. The first cement constituent is a portland cement having a calcium oxide content of at least 60 wt. %, an aluminum content of less than 3 wt. %, and a sulfur content of less than 1.5 wt. %. The second cement constituent is an ettringite forming shrinkage compensating cement of relatively high sulfur alumina content with a CaO content of less than 62% and usually less than the CaO content of a first cement constituent. The second cement constituent has an aluminum content of at least 2 wt. % and a sulfur content greater than 1.5 wt. %. The cement component (the total of the first and second cement constituents) is present in the cementitious composition in an amount of at least 30 wt. % and preferably in the range of 40-50 wt. %. The patching composition also contains an aggregate component and an accelerator component, the latter present in the amount within the range of 1-6 wt. %. The accelerator component is a polyvalent metal salt of formic acid and more specifically an alkaline earth metal formate. Preferably, the accelerator is calcium formate having an average particle size of less than 1/16". The aggregate preferably is present in an amount within the range of 45-55 wt. %. In a specific embodiment of the invention, the first cement constituent is selected from the group of consisting of Type I, Type IP, and Type III cements (including mixtures thereof) and the second constituent is selected from the group consisting of Type K, Type M and Type S cements, and mixtures thereof. In a preferred embodiment of the invention, the first constituent is Type III cement and the second constituent comprises Type K cement with a ratio of Type III to Type K cement of about 7/3.

In yet a further aspect of the invention, there is provided a process for effecting grouting repairs in a concrete surface. A dry cementitious composition as described above is mixed with 17-22 wt. % water based upon the dry composition to provide a cementitious slurry. The resulting slurry is applied to a recessed repair site in the pavement surface and allowed to cure to provide a structural repair, the compressive strength of which, as determined in accordance with ASTM C109, is at least 4000 psi at 24 hours and having a net positive volume change after 14 days curing of no more than 0.1% and a net volume change at 28 days after curing of 0±0.02%. Net volume changes are indicated by length changes as determined in accordance with ASTM C157.

DETAILED DESCRIPTION

The present invention involves a cementitious composition having three components, an hydraulic cement component, an aggregate component, and an accelerator component. The cement component comprises a mixture of hydraulic cements from two classes of cement together with an accelerator to provide a closely balanced shrinkage resistant cementitious composition. This cementitious composition is particularly well suited for the repair of holes and similar recessed repair sites which are encountered in concrete surfaces such as concrete highways, streets, and other slabs. In such applications it is important to effect repairs as expeditiously as possible in order to minimize the downtime over which the surface is not available for traffic flow or other use.

The major constituent of the hydraulic cement mixture is from the class of conventional portland cements. Such cements progressively shrink with time after the initial moist curing to provide a reduced volume and are composed of four principal compounds. These compounds (with the conventional cement chemistry abbreviated notations given in the parentheses) are tricalcium silicate, $3CaO.SiO_2$ ($C_3S$), dicalcium silicate $2CaO.SiO_2$ ($C_2S$), tricalcium aluminate, $3CaO.Al_2O_3$ ($C_3A$), and tetracalcium aluminoferrite, $4CaO.Al_2O_3.Fe_2O_3$ ($C_4AF$). The chemical composition of these cements, in terms of wt. % of oxides, is typically about ⅔ CaO, about ¼-1/5 silica, about 3-7% alumina, and usually lesser amounts of $Fe_2O_3$, MgO and $SO_3$. Thus, these portland cement compositions typically contain more than 60% CaO and less than 3% aluminum and 1.5% sulfur.

A second, minor constituent of the hydraulic cement mixture is selected from a special class of modified cements, normally referred to as expansive or shrinkage compensating cements, which are ettringite forming cements. These cements are typically substantially higher in aluminum and sulfur content then are the conventional cements. In addition, because of the increased amounts of alumina and sulfates present in these cements for the formation of ettringite, the calcium oxide content present in the form of silicates, aluminates and aluminoferrites is less than 62 wt. % and usually less than 60 wt. %. As described in Title No. 73-26 "Recommended Practice for the Use of ShrinkageCompensating Concrete" by the American Cement Institute (ACI) Committee 223, ACI Journal, June 1976, pages 319-339," such expansive cements, identified as Type K, Type M, and Type S, are based upon portland cements with added sulfoaluminate constituents which provide for the formation of ettringite. Type K cement contains portland cement, calcium sulfate and calcium sulfoaluminate; Type M-portland cement, calcium sulfate and calcium aluminate cement; and Type S-a high tricalcium aluminate portland cement and calcium sulfate. For a further description of such ettringite forming expansive cements, reference is made to Title No. 73-26 and also to Texas Industries (TXI) publication, "A guide for testing, handling and placing Type K Cement concrete a shrinkage compensating cement", the entire disclosures of which are incorporated herein by reference. As further disclosed in Title 73-26 and the TXI publication, the shrinkage compensating cement formulations undergo a fairly rapid expansion after hydration followed by gradual shrinkage during the air drying period. Portland cement, on the other hand, initially remains relatively constant in volume and then shrinks in volume until it ultimately achieves a substantial reduction in volume.

The characteristic behavior of Type K and similar cements is advantageous in some applications but also imposes constraints on their use. Such cements are advantageously used to avoid cracking in steel reinforced concrete. Thus, as disclosed in the TXI publication, when concrete based upon conventional portland cement starts to shrink, the reinforcing steel is stressed in compression and the concrete, being bonded to the reinforcing steel and unable to shrink because of the restraint imposed by the steel, is stressed in tension. The result is that the concrete cracks to relieve the tensile stresses. In Type K and similar ettringite forming cements, the initial expansive reaction stretches the steel and imposes an increased tensile stress in the steel and a corresponding compressive stress in the concrete. During the subsequent air drying period, the shrinkage of the Type K cement relieves the slight precompression in the cement and does not build up tensile stresses leading to cracks.

The relative volume changes for shrinkage compensating cements and for conventional portland cements are shown in Title No. 73-26 and the TXI publication. As shown in FIG. 1 of the TXI publication and in FIG. 2.5.3 of Title No. 73-26, for internally restrained concrete samples, the high ettringite forming cement undergoes an initial volumetric expansion during the initial moist cure period and thereafter undergoes a gradual decrease in volume during the subsequent air drying. The result is that the expansive cement returns to or near its original volume at the conclusion of the curing and drying period.

While shrinkage compensating cements are advantageously used in reinforced concrete applications, the initial expansive action of such cements indicates that they should not be used in circumstances where rigid exterior restraints are present. Thus, as disclosed in Title No. 73-26, rigid exterior restraints are not recommended since they prevent expansion of the concrete with the result that subsequent shrinkage will result in negative strains and concrete tension. For example, where framework is employed, it should be sufficiently flexible to accommodate expansion of the concrete. In fact Title No. 73-26 suggests that a resilient type of constraint such as provided by internal reinforcement is necessary for proper shrinkage compensation and that other types of restraint, including structural elements or even subgrade friction, should be avoided.

Notwithstanding the prior art indication that shrinkage compensating cements should be used only with internal reinforcement and without rigid exterior restraints, the present invention involves the use of such cements in conjunction with conventional portland cement to provide a closely shrinkage/expansive balanced grouting composition which is generally suitable for use where rigid exterior restraints are present, specifically in patching holes in concrete and the like. The grouting composition need not, and usually will not, be employed with internal reinforcing steel, although such steel may be used if desired. The grouting composition may be employed to fill holes in pavement and the like which provide substantially rigid peripheral restraint as well as the frictional restraint involved between the cementitious material and the bottom surface of the hole. Mechanical interlocking is provided by the texture of the surface of the repair site being patched. The cementitious composition of the present invention sets up rapidly, is shrinkage compensating, and is resistant to deterioration under repeated cycles of freezing and thawing.

The invention will be described in detail with reference to the preferred Type K cements. However, it will be recognized that other ettringite forming cements, specifically Type M and Type S cements, may also be used.

The preferred conventional cement constituent used in the invention is Type III portland cement. Type III is a fast setting high early strength cement which has faster setting and strength gain characteristics than Type K cement. However, portland cements having lower strength gain characteristics can also be used. Specifically, Type I which has a compressive strength at three days of about ½ of that of Type III may be employed. This normally will be accompanied by the use of a somewhat higher accelerator concentration that would be the case with Type III. Also, Type IP cement, a portland-pozzolan cement blended in accordance with ASTM C595 may be used as the major cement constituent of the hydraulic cement mixture.

A second component in the cementitious composition of the present invention is a calcium formate accelerator which is present in a concentration of 1-6 wt. %. Calcium formate is readily available and, as evidenced by the prior art references described above, its qualities and characteristics as an accelerator in portland-cement formulations are well known and understood in the art. Thus, one skilled in the art can readily arrive at the calcium formate concentration to arrive at the requisite setting time when going from one cement formulation to another; for example, when going from a Type III and Type K mixture to a Type I-Type K mixture.

The final component is an aggregate which is added for conventional purposes, that is, to extend the cementitious composition and to increase the strength of the set product where appropriate via water reduction. As described below, the aggregate preferably is a relatively fine material such as specified in accordance with ASTM C330, ASTM C33, or ASTM C144 although coarser aggregates can also be employed.

While applicant's invention is not to be limited by theory, it is believed that the combination of the accelerator component with the two different cement constituents produce a synergistic effect, possibly due to the combination of the calcium sulfoaluminate in the ettringite forming cement and the tricalcium aluminate found in the Type III (or other high calcium oxide) cement. In any event, the use of the accelerator in combination with the two cement constituents provides a considerably faster setting time at a relatively low calcium formate concentration than would be anticipated with the accelerator formulated with the Type K cement alone. Further, contrary to what would be expected from a review of curing characteristics for ASTM C150 portland and ASTM C845 ettringite forming cements as shown in FIG. 1 of the TXI publication and FIGURE 2.5.3 of Title No. 73-26, which would indicate an initial substantial expansion during the moist cure period followed by shrinkage to ultimately result in a net loss in volume somewhere between the neutral volume change for Type K and the substantial reduction in volume for ASTM C150 portland, in fact, the formulation of the present invention has very little if any net reduction in volume. Again, while the invention is not to be limited by theory, it is believed that the accelerator in combination with the two cementitious constituents may function to accelerate setting time of the formulation to the point where the formulation sets up firmly in a manner to arrive at retard subsequent shrinkage during the air drying period. A neutral or slightly positive volume change is observed even though the first hydraulic cement constituent is present in an amount substantially greater than the ettringite forming cement, preferably to provide a ratio of the first to the second cement constituent within the range of 2-3.

The present invention lends itself to formulation and packaging using cement constituents as will normally be available at cement blending and packaging plants. Thus the Type III (or other portland cement) constituent and the ettringite forming cement constituent are easily stocked in blending and packaging plants. The two cement constituents together with the aggregate are blended together using a dry mixing procedure in the desired relative proportions. The calcium formate accelerator preferably is added last in order to ensure a relatively even distribution of the accelerator throughout the dry mix composition. This is particularly preferred in order to avoid localized areas of high accelerator concentrations such as might occur if the accelerator were present upon initial mixing of the two cement constituents.

The hydraulic cement component may be employed in the dry mixture in any suitable amount but usually will be present in a concentration greater than that normally found in mortars and grouting formulations. The weight ratio of cement to aggregate usually will be about 1 or below, although the ratio can exceed 1 if desired. In terms of weight percents of the total dry mixture, the hydraulic cement component normally will be present in an amount within the range of about 30–50%, the aggregate in an amount within the range of about 45–65% and the calcium formate accelerator in an amount within the range of about 1-6 wt. %. Usually, as indicated previously, the dry mixture will contain more aggregate than cement.

In the hydraulic cement component, the weight ratio of the first cement constituent (Type III portland cement or alternative) to the second cement constituent (Type K or other ettringite forming cement) is greater than 1. Stated otherwise, the Type III cement is a major cement constituent of the hydraulic cement mixture and the Type K is a minor cement constituent. Preferably, the weight ratio of conventional portland cement to the ettringite forming cement is within the range of 2-3 and more specifically as indicated by the experimental information discussed below, this ratio is about 7/3.

The present invention is forgiving in terms of variations in aggregate particle size and it is not necessary to employ an overly carefully graded aggregate. As a practical matter, the aggregate normally will take the form of standard ASTM C33, C144, or C330 aggregate. Preferably, the aggregate has an average particle size of less than ⅜" and has a particle size distribution such that the particles pass a U.S. standard ⅜" sieve and most are retained on a #200 U.S. standard seive per ASTM E-11. Relatively large aggregate sizes, although they can be tolerated, are not necessary in the practice of the invention. It is preferred that particle sizes of the aggregate be relatively evenly graded within the range of ⅜"-#100 sieve and that the predominant particle volume (specifically more than 58%) passes through a #16 U.S. standard sieve.

There is a definite advantage in using a relatively finely divided calcium formate accelerator in order to avoid segregation of the accelerator in the dry mixture, to obtain a relatively even distribution of accelerator throughout the mix, and to increase the surface area to increase the reaction time. A preferred accelerator is technical grade granular calcium formate (purity of 96%) having an average particle size less than 1/16" and passing through #10 and retained on #325 U.S. sieve with the predominant particle size of about #80 mesh U.S. sieve. This particle size distribution mixes easily without segregation with the two cement constituents and the aggregate component of the dry mixture.

As noted previously, the present invention offers a number of important advantages in terms of economy, setting time, high strength gain, shrinkage balance, and durability. These advantages are illustrated by experimental work carried out respecting a cementitious composition embodying the present invention (formulation A), an alternative approach based upon the use of a calcium sulfate hemihydrate modified cement mixture (formulation B) to arrive at a fast setting time, and a third formulation (identified herein as formulation C), a commercially available grouting composition used for concrete patching applications. The compositions for formulations A and B are set forth below in Tables IA and IB. The composition of formulation C was not determined.

TABLE IA

| Component | wt. % |
|---|---|
| Type III cement | 31.9 |
| Type K cement | 13.7 |
| Tech Grade Calcium formate | 3.4 |
| Sand | 51.0 |

TABLE IB

| Component | wt. % |
|---|---|
| Type III cement | 30.6 |
| Type K cement | 12.3 |
| $CaSO_4.1/0\ H_2O$ | 10.0 |
| Sand | 47.1 |

Tests in two laboratories (identified herein as Laboratories 1 & 2) were run for each of the fast setting formulations A and B. Formulation C was tested in laboratory No. 1. The results of the test procedures are set forth in Table II. In Table II the results for formulation A are set forth in the first and second columns and for the alternative fast setting composition B in columns 3 and 4. The laboratories are identified in Table II by references 1 and 2. Thus, the test results in column 1 under designation A-1 may be compared directly with the test results in columns 3 and 5 under designation B-1 and C-1, and the data in columns 2 and 4 may likewise be directly compared.

Further in regard to the data set forth in Table II, the Gillmore setting times were determined in accordance with ASTM C266 and the compressive strengths were determined in accordance with ASTM C109. The percent length changes for specimens A-1, A-2 and B1 were determined in accordance with ASTM C157. As explained in ASTM C157 the percent change in length is representative of volumetric expansion or contraction due to factors other than applied force or temperature change.

TABLE II

| | 1<br>A-1 | 2<br>A-2 | 3<br>B-1 | 4<br>B-2 | 5<br>C-1 |
|---|---|---|---|---|---|
| Setting Time (Gillmore) in minutes | | | | | |
| Initial | 15 | 10 | 7 | 14 | 30 |
| Final | 30 | 24 | 16 | 25 | 50 |
| Compressive Strength, PSI, at specimen age: | | | | | |
| 2 hours | 300 | 100 | 49 | 135 | 2717 |
| 6 hours | 1238 | 381 | 842 | 910 | 3308 |
| 24 hours | 5888 | 4150 | 4588 | 5967 | 5517 |
| 3 days | 8250 | 8475 | 5550 | 7258 | 7967 |
| 7 days | N/C | 9975 | 6550 | 7675 | 9608 |
| 28 days | N/C | 12900 | 7563 | 8242 | 10667 |
| % Length Change at 14 days | +0.063 | +0.03773 | +0.79036 | | |

N/C = Not Completed

The early strength data for formulation A-2 at 2, 6 and 24 hours were adversely affected by difficulty in completing the ASTM C109 molding procedure prior to setting. It is believed this difficulty had a negative impact on the early strength figures, and that the data for specimen A-1 at 2, 6 and 24 hours are the more reliable.

As can be seen from an examination of the data presented in Table II, composition A embodying the present invention had initial and final setting times near those achieved by the use of the calcium sulfate modified cement and compressive strengths generally in excess of those indicated for the calcium sulfate modified cement composition. The compressive strengths for the formulation A after the first few hours approached or exceeded the compressive strength indicated for the conventional grouting compound which had substantially faster setting times. Composition A had slightly positive length change values at 14 days that are significantly lower than for Composition B. This is significant in that the greater early expansion of Composition B ultimately causes its disruption and low durability. This is one indication of the superiority of Composition A over Composition B. After drying and long-term drying shrinkage occurs, the resulting net volume or length change will be about neutral or zero.

The ASTM C157 procedure referred to above is carried out to determine the change in length of unrestrained specimens. Thus, the results obtained in accordance with ASTM C157 expressed in terms of change in length as a percent of the original specimen length is representative of the change in bulk volume of the patching material during the curing process. As explained above, the patching material is normally mixed with 17-22 percent water, based upon the dry composition, to provide a slurry containing about 14-18 wt. % water. After the composition is mixed with water and the resulting group allowed to set, the patching material should initially expand but it should not expand too much. After curing for 14 days after the addition of the mix water, specifically water added in an amount of 17 Wt. %, it preferably exhibits a length change as determined by ASTM C157 of no more than 0.1%. At the conclusion of 28 days curing, the length change as determined in accordance with ASTM C157 should be zero +0.02%. It is also preferred under these circumstances that the final setting time and the initial setting time as determined in accordance with ASTM C266 be less than 40 minutes and 20 minutes, respectively.

Concrete samples formulated in accordance with formulation A were subject to repeated freeze-thaw cycles conducted in accordance with ASTM C666-84. Five specimens were prepared by mixing 17.1 % by wt. water with the dry mixture set forth in Table IA to provide a slurry containing 14.6 wt. % water. The specimens were cured for 14 days, at which time a freeze-thaw regimen in accordance with ASTM C666-84 was initiated. The relative modulii of elasticity (expressed as a percent for each specimen) through 100 cycles are set forth in Table III. As shown in Table III, the relative modulus of elasticity remained very high, and after 100 cycles, averaged about 80%. In addition, the weight loss recorded after 15, 66, 82 and 100 cycles was found to be negligible.

TABLE III

| | Relative Modulus of Elasticity, % | | | | | |
|---|---|---|---|---|---|---|
| | Specimens | | | | | |
| Cycles | 1 | 2 | 3 | 4 | 5 | Average |
| 0 | 100 | 100 | 100 | 100 | 100 | 100 |
| 15 | 100 | 100 | 100 | 100 | 100 | 100 |
| 66 | 95.4 | 94.6 | 85.8 | 75.6 | 75.4 | 85.4 |
| 82 | 91.6 | 86.3 | 84.5 | 75.6 | 75.4 | 82.7 |
| 100 | 86.1 | 85.5 | 80.8 | 75.6 | 72.4 | 80.1 |

A final test procedure for the composition A involved scaling resistant tests carried out in accordance with ASTM C672-84. In this procedure two concrete blocks were cast from a slurry containing 14.6 wt. % water formed by adding 17.1% water to the dry cementitious composition. The two specimens were cured in a moist closet for 14 days and then subjected to a total of 50 freeze-thaw cycles as outlined in ASTM C672-84. The results in terms of the average weight loss and surface scaling for the two blocks are set forth in Table IV. As shown in Table IV, the blocks went from a condition of slight to moderate scaling to severe scaling after 35 cycles.

TABLE IV

| | Weight Block-1 | Block-2 | Cumulative Average Weight | Average Loss | Scaling Rating* |
|---|---|---|---|---|---|
| Initial Weight | 18.78 | 18.60 | 18.69 | | |
| After 5 Cycles | 18.73 | 18.53 | 18.63 | | 2 |
| Loss 0-5 Cycles | .05 | .07 | .06 | .06 | |
| After 10 Cycles | 18.65 | 18.43 | 18.54 | | 3 |
| Loss 5-10 Cycles | .08 | .10 | .09 | .15 | |
| After 15 Cycles | 18.61 | 18.33 | 18.47 | | 3 |
| Loss 10-15 Cycles | .04 | .10 | .07 | .22 | |
| After 20 Cycles | 18.51 | 18.18 | 18.35 | | 3 |
| Loss 15-20 Cycles | .10 | .15 | .13 | .35 | |
| After 25 Cycles | 18.44 | 18.12 | 18.28 | | 3 |
| Loss 20-25 Cycles | .07 | .06 | .07 | .42 | |
| After 30 Cycles | 18.37 | 18.00 | 18.19 | | 4 |
| Loss 25-30 Cycles | .07 | .12 | .10 | .52 | |
| After 35 Cycles | 18.31 | 17.93 | 18.12 | | 5 |
| Loss 30-35 Cycles | .06 | .07 | .07 | .59 | |
| After 40 Cycles | 18.21 | 17.79 | 18.00 | | 5 |
| Loss 35-40 Cycles | .10 | .14 | .12 | .71 | |
| After 45 Cycles | 18.13 | 17.70 | 17.92 | | 5 |
| Loss 40-45 Cycles | .08 | .09 | .09 | .80 | |
| After 50 Cycles | 18.05 | 17.62 | 17.84 | | 5 |
| Loss 45-50 Cycles | .08 | .08 | .08 | .88 | |
| TOTAL LOSS | .73 | .98 | .85 | | |

| *Rating | Condition of Surface |
|---|---|
| 0 | No scaling |
| 1 | Very slight scaling ⅛ in, (3.2 mm) depth, maximum. No coarse aggregate visible. |
| 2 | Slight to moderate scaling |
| 3 | Moderate scaling (some coarse aggregate visible) |
| 4 | Moderate to severe scaling |
| 5 | Severe scaling (coarse aggregate visible over entire surface |

Having described specific embodiments of the present invention, it will be understood that modification thereof may be suggested to those skilled in the art, and it is intended to cover all such modifications as fall within the scope of the appended claims.

I claim:

1. A shrinkage compensating fast-setting cementitious composition comprising:
   (a) an hydraulic cement component having a major amount of a first portland cement constituent having a CaO content of at least 60 wt. %, an aluminum content of less than 5½ wt. %, and a sulfur content of less than 1.5 wt. % and a minor amount of a second cement constituent expansive ettringite forming sulfo-alumina cement constituent having a CaO content of less than 62%, an aluminum content of at least 2%, and a sulfur content greater than 1.5%, said hydraulic cement component being present in said cementitious composition in an amount of at least 30 wt. %;
   (b) an aggregate component; and
   (c) a particulate accelerator component comprising a polyvalent metal salt of formic acid present in a concentration within the range of 1-6 wt. %.

2. The composition of claim 1 wherein the CaO content of said second cement constituent is less than that of said first constituent.

3. The composition of claim 1 wherein said accelerator comprises an alkaline earth metal formate.

4. The composition of claim 1 wherein said accelerator is calcium formate.

5. The composition of claim 4 wherein the average particle size of said calcium formate is less than 1/16".

6. The composition of claim 5 wherein the average particle size of said aggregate is less than ⅜".

7. The composition of claim 6 wherein said cement component is present in an amount within the range of 30-50 wt. % and said aggregate component is present in an amount within the range of 45-65 wt. %.

8. The composition of claim 1 wherein the weight ratio of said first cement constituent to said second cement constituent is within the range of 2-3.

9. The composition of claim 1 wherein said first cement constituent is selected from the group consisting of Type I cement, Type IP cement and Type III cement and mixtures thereof.

10. The composition of claim 9 wherein said second cement constituent is selected from the group consisting of Type K, Type M, and Type S cement and mixtures thereof.

11. The composition of claim 10 wherein said first cement constituent comprises Type III cement and said second cement constituent comprises Type K cement.

12. The composition of claim 11 wherein the ratio of said Type III to Type K cement is 7:3.

13. The composition of claim 12 wherein said accelerator is calcium formate.

14. The composition of claim 13 wherein said calcium formate has an average particle size less than 1/16″.

15. The composition of claim 1 characterized by a length change as determined by ASTM C157 of less than 0.1% after 14 days curing and with mix water in the amount of 17-22 wt. % of said composition.

16. The composition of claim 15 characterized by a length change as determined by ASTM C157 of 0±0.02% after 28 days curing.

17. The composition of claim 15 characterized by a final setting time as determined in accordance with ASTM C266 of less than 40 minutes.

18. The composition of claim 17 characterized by an initial setting time as determined in accordance with ASTM C266 of less than 20 minutes.

* * * * *